(12) United States Patent
Oda et al.

(10) Patent No.: US 8,572,977 B2
(45) Date of Patent: Nov. 5, 2013

(54) COMBUSTOR OF A GAS TURBINE ENGINE

(75) Inventors: Takeo Oda, Kobe (JP); Hideki Ogata, Kakogawa (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 1310 days.

(21) Appl. No.: 12/076,087

(22) Filed: Mar. 13, 2008

(65) Prior Publication Data
US 2008/0245074 A1   Oct. 9, 2008

(30) Foreign Application Priority Data
Apr. 5, 2007   (JP) ................................. 2007-099589

(51) Int. Cl.
*F02C 7/232*   (2006.01)
(52) U.S. Cl.
USPC ........................................ 60/739; 60/39.281
(58) Field of Classification Search
USPC .............. 60/734, 739, 742, 737, 39.281, 773, 60/776
See application file for complete search history.

(56) References Cited

U.S. PATENT DOCUMENTS

| | | | | |
|---|---|---|---|---|
| 2,963,082 A | * | 12/1960 | Binford et al. ............. | 239/533.2 |
| 5,066,221 A | * | 11/1991 | Becker ........................... | 431/280 |
| 6,202,401 B1 | * | 3/2001 | Seume et al. .................... | 60/776 |
| 6,250,063 B1 | * | 6/2001 | Davis et al. ...................... | 60/773 |
| 6,666,029 B2 | * | 12/2003 | Ryan ................................ | 60/776 |
| 2002/0011064 A1 | * | 1/2002 | Crocker et al. .............. | 60/39.06 |
| 2006/0016198 A1 | * | 1/2006 | Stuttaford et al. ............... | 60/776 |

FOREIGN PATENT DOCUMENTS

| | | |
|---|---|---|
| EP | 0 371 250 A1 | 6/1990 |
| GB | 718427 | 11/1954 |
| JP | A-05-052124 | 3/1993 |

OTHER PUBLICATIONS

Feb. 18, 2010 Search Report issued in European Patent Application No. 08153459.6.

* cited by examiner

*Primary Examiner* — Andrew Nguyen
(74) *Attorney, Agent, or Firm* — Oliff & Berridge, PLC

(57) ABSTRACT

The present combustor of gas turbine engine includes: a fuel injection unit including a fuel spray part to spray a fuel so that a diffusion combustion region is formed in a combustion chamber, and a pre-mixture supply part to supply a pre-mixture of a fuel and an air so that a pre-mixture combustion region is formed in the combustion chamber; and a fuel supply unit to supply the fuel to the fuel spray part and pre-mixture supply part. The fuel supply unit includes: a pilot fuel passage and a main fuel passage to supply the fuel to the fuel spray part and the pre-mixture supply part, respectively; an assembled fuel passage to supply the fuel to the pilot and main fuel passages; and a fuel distributor disposed at a branch point where the assembled fuel passage is connected to both the pilot and main fuel passages. The fuel distributor is configured to automatically control amounts of the fuel to be distributed to the pilot fuel passage and to the main fuel passage in accordance with the fuel pressure.

5 Claims, 10 Drawing Sheets

COMBUSTOR OF A GAS TURBINE ENGINE

CROSS REFERENCE TO RELATED APPLICATIONS

This application is based upon the prior Japanese Patent Application No. 2007-99589 filed on Apr. 5, 2007, the entire contents of which are incorporated herein by reference.

BACKGROUND OF THE INVENTION

1. Field of the Invention

The present invention relates to a combustor of a gas turbine engine including a fuel injection structure of a composite combustion type comprising a combination of two combustion systems, i.e., a diffusion combustion system and a lean pre-mixture combustion system.

2. Description of the Related Art

For the gas turbine engine, in view of the environmental protection, strict criteria are provided, with respect to the composition of exhaust gases to be generated by combustion. In the criteria, reduction of harmful matters, such as nitrogen oxides (hereinafter, referred to as NOx), is greatly required. On the other hand, in the case of large-size gas turbines and/or engines for airplanes, from the requirements of reducing the fuel consumption and enhancing the output, the pressure ratio currently tends to be set higher. With such a tendency, higher temperature and/or higher pressure operation is to be employed around the inlet of the combustor. Therefore, due to such operations to elevate the temperature and/or pressure around the inlet of the combustor, the combustion temperature may also tend to be higher, leading to further increase of NOx.

In recent years, a composite combustion method has been proposed, in which the lean pre-mixture combustion system that can effectively reduce an amount of generation of NOx and the diffusion combustion system excellent in both of the ignition performance and the flame holding performance are combined together. In the lean pre-mixture combustion system, air and a fuel are mixed in advance so as to combust or burn the so-obtained mixed gas or mixture, with the fuel concentration of the gas being kept uniform. Thus, there should be no region in which the flame temperature is locally elevated. In addition, the flame temperature can be lowered over the whole region due to such dilution of the fuel. Therefore, the amount of generation of NOx can be effectively reduced. However, because a considerably great amount of air is to be mixed uniformly with the fuel, a local fuel concentration in the combustion region may tend to be significantly low. In particular, the stability of combustion, especially upon lower intensity combustion, is likely to be deteriorated. On the other hand, the diffusion combustion system is configured to perform combustion while diffusing and mixing the fuel and air. Therefore, flame failure of the combustion is not likely to occur even upon the lower intensity combustion, presenting a superior flame holding performance. Accordingly, the composite combustion system as described above can ensure the stability of combustion, due to a diffusion combustion region to be formed upon starting the operation and/or upon the lower intensity combustion, as well as can reduce the amount of generation of the NOx, due to a lean pre-mixture combustion region to be formed upon higher intensity combustion.

A combustor based on the composite combustion system includes a fuel spray part configured to spray a fuel, so as to form the diffusion combustion region in a combustion chamber, due to the diffusion combustion system, and a pre-mixture supply part configured to supply a pre-mixture of the fuel and air, so as to form the pre-mixture combustion region in the combustion chamber, due to the lean pre-mixture combustion system. The combustor is configured to supply the fuel only from the fuel spray part upon starting the operation and/or upon a lower intensity combustion mode, while, on a higher intensity combustion mode, it is configured to supply the fuel also from the pre-mixture supply part. In this case, during the transition from the lower intensity combustion mode to the higher intensity combustion mode, the distribution ratio of the fuel to the fuel spray part and to the pre-mixture supply part should be controlled, for example, from 1:0 to 1:9, while keeping appropriate conditions for the combustion stability and reduction of NOx.

Conventionally, in order to achieve such a complicated control, flow control valves have been provided to a pilot fuel passage for supplying the fuel to the fuel splay part as well as to a main fuel passage for supplying the fuel to the pre-mixture supplying part, respectively, wherein the flow control valves are controlled by a controller, respectively (JP 5-52124 A).

SUMMARY OF THE INVENTION

As described above, when providing the flow control valves to the two fuel passages respectively, although varying with engines for airplanes and those for other industrial applications or with large-size airplanes and small-size ones, especially in the gas turbine engines for the small-size airplanes, the ratio of the flow control valves and the controller relative to the total weight and cost of the whole construction of the engine should be significantly large, resulting in non-negligible affection to the implementation. This has been a substantial obstacle to the application of the composite combustion system requiring such an additional fuel control system (i.e., the flow control valves and controller) to the gas turbine engines for the small-size airplanes.

It is an object of the present invention to provide a combustor of a gas turbine engine based on the composite combustion system composed of the combination of the two combustion systems, i.e., the diffusion combustion system and the lean pre-mixture combustion system, which can provide secure fuel flow control with a simpler structure and a lower cost.

In order to achieve the above object, the combustor of the gas turbine engine according to the present invention comprises: a fuel injection unit including a fuel spray part configured to spray a fuel so that a diffusion combustion region is formed in a combustion chamber, and a pre-mixture supply part configured to supply a pre-mixture of a fuel and an air so that a pre-mixture combustion region is formed in the combustion chamber; and a fuel supply unit configured to supply the fuel to the fuel spray part and the pre-mixture supply part. The fuel supply unit includes: a pilot fuel passage and a main fuel passage configured to supply the fuel to the fuel spray part and the pre-mixture supply part, respectively; an assembled fuel passage configured to supply the fuel to the pilot fuel passage and the main fuel passage; and a fuel distributor disposed at a branch point where the assembled fuel passage is connected to both of the pilot fuel passage and the main fuel passage, the fuel distributor being configured to automatically control amounts of the fuel to be distributed to the pilot fuel passage and to the main fuel passage in accordance with a pressure of the fuel.

With this configuration, the amounts of the fuel to be distributed to the pilot fuel passage and to the main fuel passage can be automatically controlled in accordance with the pressure of the fuel, only by providing the fuel distributor at the branch point into the pilot fuel passage and the main fuel passage from the assembled fuel passage. Accordingly, there should be no need for providing flow rate control valves to the pilot fuel passage and to the main fuel passage, respectively. Therefore, the structure can be simplified and necessity of using a complicated control circuit can be eliminated, thereby reducing the cost.

In this invention, preferably the fuel injection unit comprises a plurality of fuel injection units. The pilot fuel passage and the main fuel passage are configured to supply the fuel to the plurality of fuel injection units. Namely, the construction described above may be of a single fuel distributor type such that the fuel can be supplied to the plurality of fuel injection units through the pilot fuel passage and the main fuel passage, respectively, from the single fuel distributor. In addition, other than the construction of this type, a multiple fuel distributor type may also be employed, in which the fuel injection unit comprises a plurality of fuel injection units. The fuel distributor comprises a plurality of fuel distributors, each of the fuel distributors being disposed for each of the plurality of fuel injection units. The pilot fuel passage comprises a plurality of pilot fuel passages, and the main fuel passage comprises a plurality of main fuel passages, the pilot fuel passages and the main fuel passages being independently provided for respective fuel injection units.

Both of these types can be optionally selected, taking into account merits and demerits with respect to the weight and cost of the fuel distributor and the fuel manifolds, respectively. For instance, in the single fuel distributor type, only a single fuel distributor should be needed, while in the multiple fuel distributor type, the piping required for reaching the fuel distributor for each respective injection unit should be composed of only a single thicker assembled fuel passage (for a greater flow rate).

In this invention, it is preferred that the fuel distributor includes a fuel inlet configured to introduce the fuel from the assembled fuel passage into the fuel distributor, a pilot port and a main port configured to be connected to the pilot fuel passage and the main fuel passage, respectively, and a movable body configured to be moved in accordance with the pressure of the fuel at the fuel inlet so as to bring only the pilot port in communication with the fuel inlet upon a lower fuel pressure operation and bring both of the pilot port and the main port in communication with the fuel inlet upon a moderate fuel pressure operation as well as upon a higher fuel pressure operation.

Consequently, upon the lower fuel pressure operation corresponding to the lower intensity combustion mode, the fuel can be supplied to the pilot fuel passage via the pilot port, while upon the higher fuel pressure operation corresponding to the higher intensity combustion mode as well as upon the moderate fuel pressure operation corresponding to the moderate intensity combustion mode defined between the lower intensity combustion mode and the higher intensity combustion mode, the fuel can be supplied to both of the fuel passages via both of the ports, respectively. Therefore, the fuel distribution to the pilot fuel passage as well as to the main fuel passage can be performed automatically and smoothly. Generally, the fuel flow rate is in proportion to a square root of the fuel pressure when the passage area is constant, while it is in proportion to the passage area when the fuel pressure is constant. Therefore, by changing the passage area based on the fuel pressure, a desired fuel flow rate can be obtained corresponding to each load. The fuel distributor is not designed to be actuated with a complicated control circuit, but adapted to be automatically actuated in accordance with the fuel pressure. Therefore, there should be no risk of failure of the flow rate control of the fuel to be caused by malfunction of the control circuit.

In this invention, it is preferred that the pilot port includes a first port configured to be in communication with the fuel inlet upon the lower fuel pressure operation as well as upon the moderate fuel pressure operation and a second port configured to be in communication with the fuel inlet upon the moderate fuel pressure operation as well as upon the higher fuel pressure operation.

Consequently, the supply of fuel to the pilot fuel passage can be performed, gradually shifting from the first port to the second port, over from the lower intensity combustion mode to the moderate intensity combustion mode. Therefore, unlike the case in which the second port is opened after the first port is closed, the amount of supply of the fuel can be reduced smoothly.

In this invention, it is preferred that the pilot port, the main port and the fuel inlet are formed on a housing, the movable body being a piston housed in the housing. With this configuration, a simpler structure can be achieved, in which the housing serves as a cylinder and the piston can be moved through the housing in accordance with the fuel pressure at the fuel inlet, thus also simplifying the structure of the entire combustor.

Further, in this invention, it is preferred to further comprise a flow rate control valve disposed to the assembled fuel passage, the flow rate control valve being configured to control a total flow rate of the fuel throughout the combustor. With this configuration, the fuel required for the entire combustor can be controlled due to only the single total fuel flow rate control valve, as such simplifying the structure and facilitating the control, as compared with the conventional case in which the flow rate control valves are provided to the pilot fuel passage and to the main fuel passage, respectively.

With the combustor of the gas turbine engine according to the present invention, the amounts of the fuel to be distributed to the pilot fuel passage and to the main fuel passage can be automatically controlled in accordance with the pressure of the fuel, only by providing the fuel distributor at the branch point where the assembled fuel passage is connected to both of the pilot fuel passage and the main fuel passage. Accordingly, there should be no need for providing flow rate control valves to the pilot fuel passage and to the main fuel passage, respectively. Therefore, the structure can be simplified and necessity of using a complicated control circuit can be eliminated, thereby reducing the cost of the combustor.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
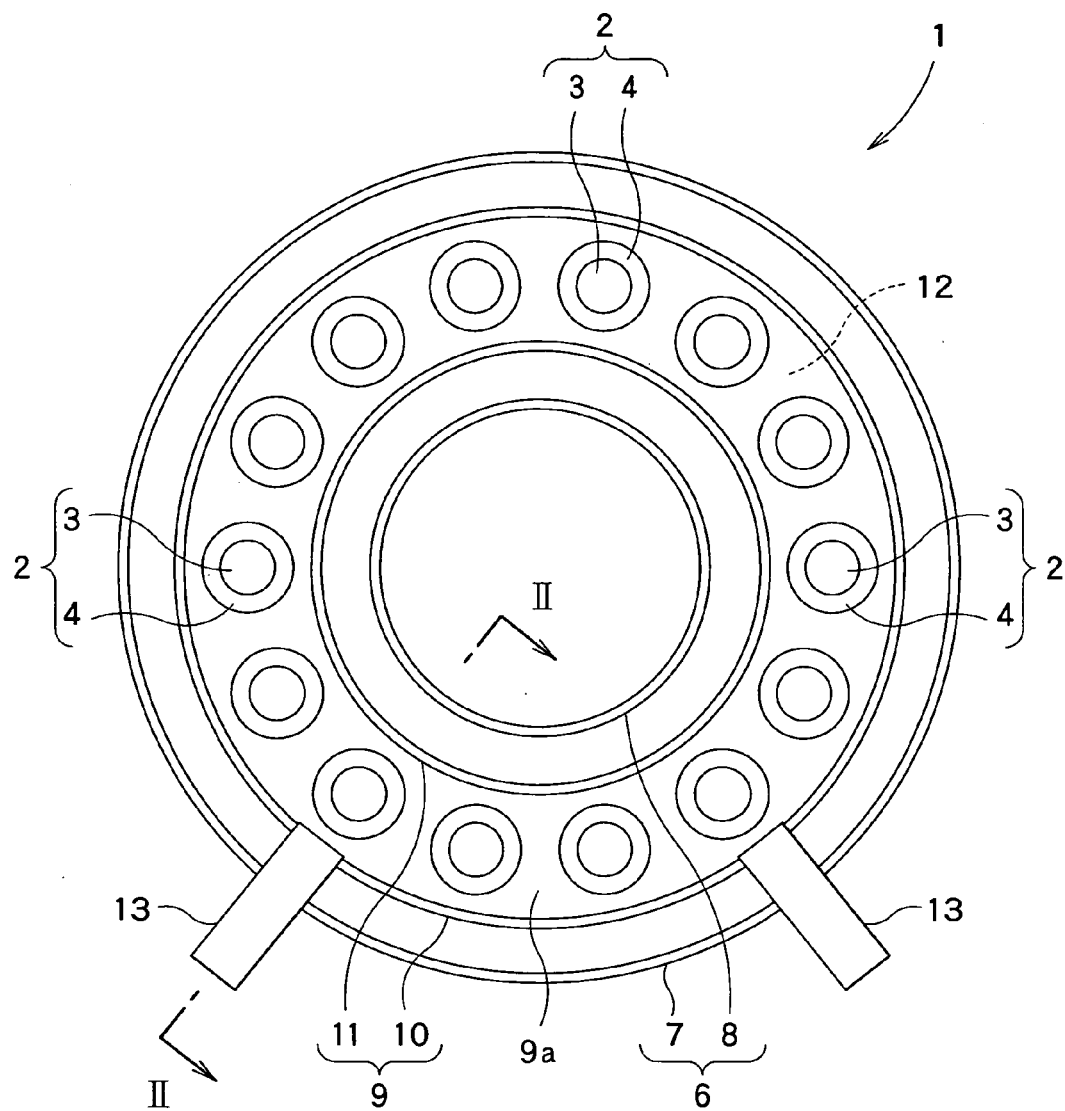
FIG. 1 is a schematic front view showing a combustor of a gas turbine engine according to a first embodiment of the present invention.

Hereinafter, preferred embodiments of the present invention will be described with reference to the drawings. FIG. 1 shows a head of a combustor 1 constituting a gas turbine engine according to a first embodiment of the present invention. The combustor 1 is configured to drive a turbine, by combusting a mixed gas or mixture to be formed by mixing a fuel with compressed air supplied from a compressor (not shown) of the gas turbine engine, and then supplying the so-formed high-temperature and high-pressure combustion gas created by such combustion to the turbine.

The combustor 1 is of an annular type, in which a combustor housing 6 having an annular internal space is constructed by arranging an annular inner casing 8 concentrically in an annular outer casing 7. In the annular internal space of the combustor housing 6, a combustion cylinder 9, which is constructed by arranging an annular inner liner 11 concentrically in an annular outer liner 10, is arranged concentrically with the combustor housing 6. The combustion cylinder 9 has an annular combustion chamber 12 formed therein. In a top wall 9a of the combustion cylinder 9, a plurality of (fourteen (14) in this embodiment) fuel injection units 2 each adapted to inject the fuel into the combustion chamber 12 are provided concentrically with the combustion cylinder 9 with an equal interval, while arranged in a single circle. Each fuel injection unit 2 includes a fuel spray part (pilot fuel injection nozzle) 3, and a pre-mixture supply part (main fuel injection nozzle) 4 configured to surround the outer circumference of the fuel spray part 3 and arranged concentrically with the fuel spray part 3. The fuel spray part 3 and pre-mixture supply part 4 will be detailed later.

Through the outer casing 7 and outer liner 10, two spark plugs 13 adapted for ignition extend in the radial direction relative to the combustion cylinder 9, with the distal ends thereof being opposed to the fuel injection units 2, respectively. Accordingly, in the combustor 1, the combustible mixed gas to be injected from the two fuel injection units 2 opposed to the two spark plugs 13 is first ignited, and the flame to be created due to the combustion then burns the combustible mixed gas to be injected from adjacent fuel injection units 2, after another. Finally, the flame transfers to and ignites the mixed gas to be injected from all of the fuel injection units 2.

Figure 2:
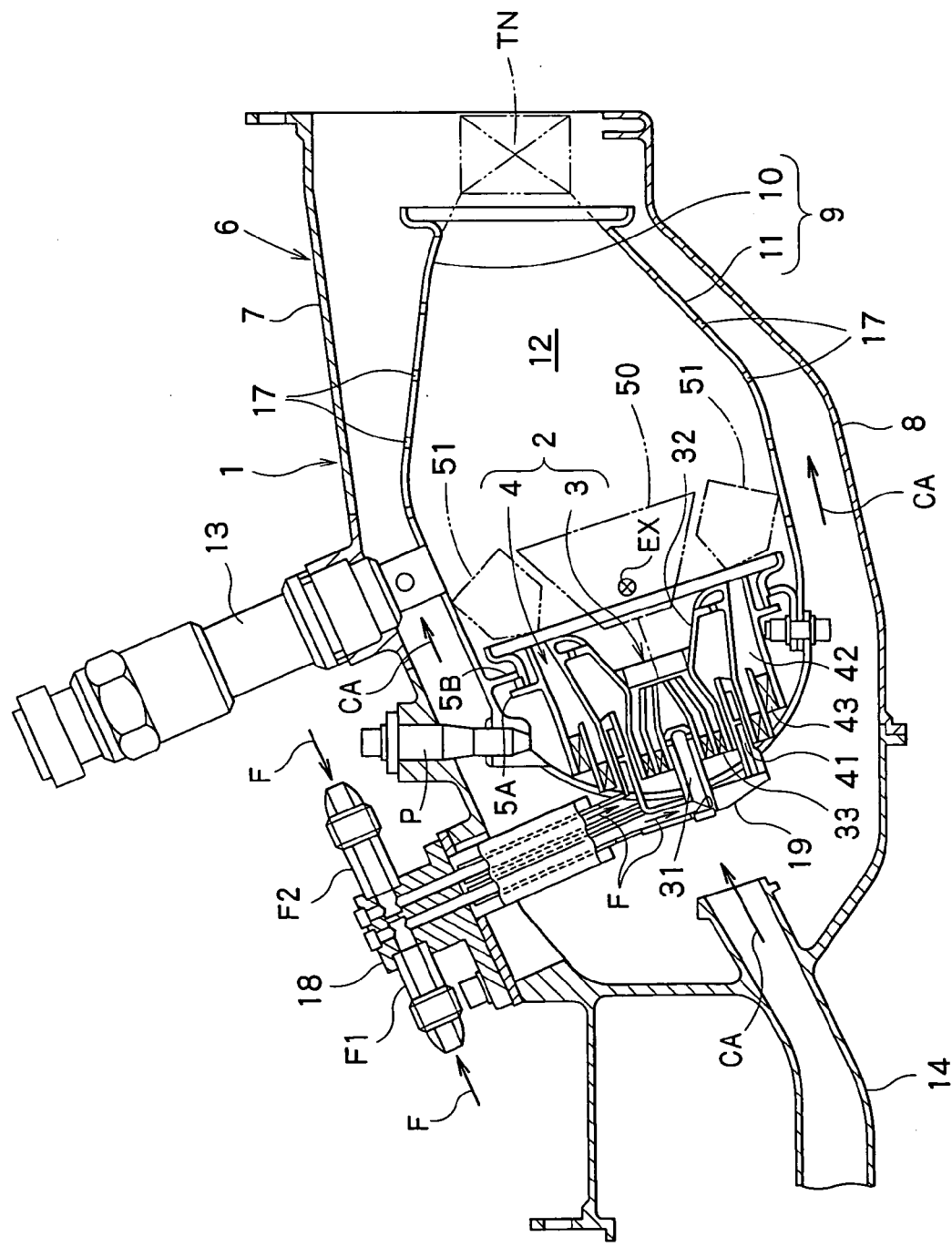
FIG. 2 is an enlarged section taken along line II-II of FIG. 1.

FIG. 2 is an enlarged longitudinal section taken along line II-II of FIG. 1. In the annular internal space of the combustor housing 6, compressed air CA supplied from the compressor is introduced via an annular pre-diffuser passage 14. The compressed air CA introduced is then supplied into the fuel injection unit 2, while it is supplied into each combustion chamber 12 through air introduction ports 17 respectively formed in large numbers in the outer liner 10 as well as in the inner liner 11 of the combustion cylinder 9. A fuel piping unit 18, constituting a first fuel supply system F1 for supplying the fuel to be used for diffusion combustion into the fuel spray part 3 and a second fuel supply system F2 for supplying a fuel to be used for lean pre-mixture combustion into the pre-mixture supply part 4, is supported by the outer casing 7, and is connected with a base 19 of the combustion cylinder 9. The fuel injection unit 2 is supported by the outer liner 10 via a flange 5A provided to the outer circumferential portion of the fuel injection unit 2 and a support member 5B provided to the outer liner 10. The outer liner 10 is in turn supported by the outer casing 7 via a liner fixing pin P. A first stage nozzle TN of the turbine is connected with a downstream end of the combustion cylinder 9.

The fuel spray part 3 is located at a central portion of the fuel injection unit 2. The fuel spray part 3 includes a fuel nozzle 31, a diffusion nozzle 32, and a double-wall swirler 33. With such a fuel spray part 3, a diffusion combustion region 50 can be created by injecting the fuel F supplied from the first fuel supply system F1 for the diffusion combustion via the fuel nozzle 31, changing the fuel F into particles with the compressed air CA having passed through the swirler 33, and spraying the particles into the combustion chamber 12 through the diffusion nozzle 32.

The annular pre-mixture supply part 4 is provided, surrounding the outer circumference of the fuel spray part 3. The pre-mixture supply part 4 includes fuel nozzles 41, which are provided in the circumferential direction with an equal interval, a pre-mixture passage 42, and a second double-wall swirler 43. With such a pre-mixture supply part 4, a pre-mixture combustion region 51 can be created by injecting the fuel F supplied from the second fuel supply system F2 for the pre-mixture combustion into the pre-mixture passage 42 via the fuel nozzles 41, mixing the injected fuel F with the compressed air CA having passed through the swirler 43 so as to produce a pre-mixture, and injecting the pre-mixture into the combustion chamber 12.

To the fuel spray part 3, the fuel F is supplied from the first fuel supply system F1 in all the range of load or intensity. On the other hand, to the pre-mixture supply part 4, the fuel F is supplied from the second fuel supply system F2 upon the higher intensity combustion mode, i.e., 70% or higher load relative to the full load, as well as on the moderate intensity combustion mode defined between the higher intensity combustion mode and the lower intensity combustion mode, i.e., 40 to 70% load relative to the full load. Thus, since the fuel F is not supplied to the pre-mixture supply part 4 upon the lower intensity combustion mode that is 40% or lower of the full load, only the compressed air CA is supplied to the combustion chamber 12 through the swirler 43 upon that mode.

Next, a fuel control system in the combustor of the gas turbine engine will be described with reference to FIG. 3. As shown in the drawing, the embodiment includes a fuel supply unit 70 which is configured to supply the fuel to the fuel spray parts 3 and the pre-mixture supply parts 4 of the fuel injection units 2. To each fuel injection unit 2 of the combustor 1, a common pilot fuel passage 64 and a common main fuel passage 65 of the fuel control system are connected, respectively, and upstream ends of the pilot fuel passage 64 and main fuel passage 65 are in turn connected with an assembled fuel passage 63, respectively. A fuel pump 60 is connected with the assembled fuel passage 63 and a total flow rate control valve 62 is provided in the middle of the assembled fuel passage 63. The total flow rate control valve 62 is controlled by a fuel controller 61. With such configuration, the fuel F is supplied into the assembled fuel passage 63 due to actuation of the fuel pump 60, and a degree of opening the total flow rate control valve 62 is properly set by the fuel controller 61 which has received an output command signal to be sent such as by operation of an external throttle lever or the like, so that a desired amount of the fuel F can be supplied to the entire combustor 1, from the assembled fuel passage 63 through both of the pilot fuel passage 64 and the main fuel passage 65, due to the total flow rate control valve 62.

A fuel distributor 66 is provided at a branch point where the assembled fuel passage 63 is connected with the pilot fuel passage 64 and the main fuel passage 65. The pilot fuel passage 64 is further branched into a plurality of (fourteen) passages 64a, and these branch passages 64a are respectively communicated with the first fuel supply systems F1 for supplying the fuel F to the fourteen fuel injection units 2 of the fuel spray parts 3, respectively. Similarly, the main fuel passage 65 is further branched into a plurality of (four teen) passages 65a, and these branch passages 65a are respectively communicated with the second fuel supply systems F2 for supplying the fuel F to the fourteen fuel injection units 2 of the pre-mixture supply parts 4, respectively. To the main fuel passage 65, a shut-off valve 67 is provided, which serves to shut off the passage 65 when the load of the gas turbine engine is lower than a predetermined value, i.e., upon the lower intensity combustion mode including the point of starting the gas engine, thereby securely stopping the main fuel passage 65 in that mode. Consequently, upon the lower intensity combustion mode, only the diffusion combustion due to the fuel spray part 3 can be performed, so as to ensure the stability of combustion including the ignition performance and the flame holding performance. However, if the sealing ability provided to the fuel distributor 66 would be enough to securely shut off the main fuel passage 65, the shut-off valve 67 may not be provided to the passage 65.

Figure 4:
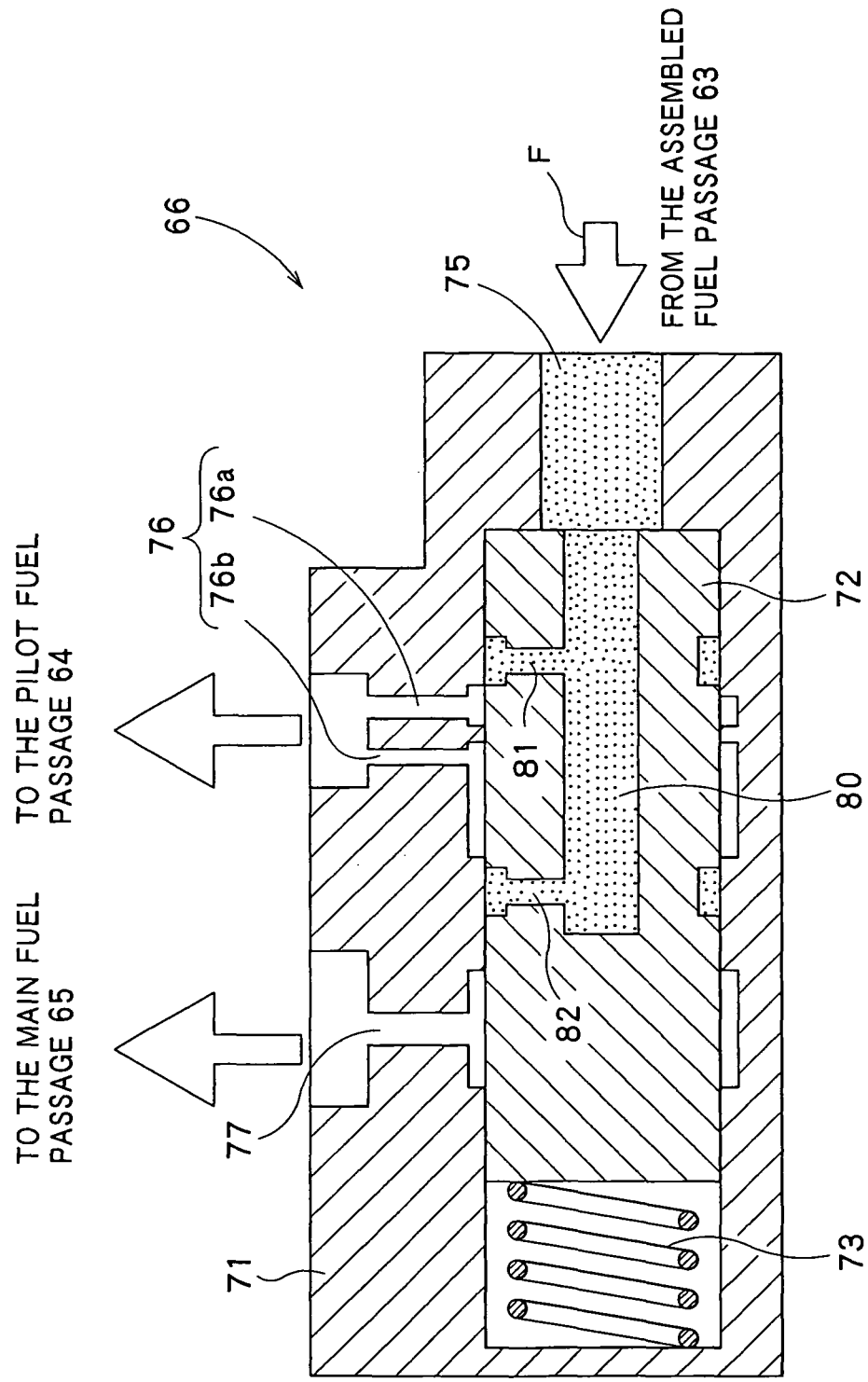
FIG. 4 is a longitudinal section for schematically showing a fuel distributor prior to activation.

FIG. 4 is a longitudinal section for schematically showing the fuel distributor 66 prior to activation. As shown in the same drawing, the fuel distributor 66 is of a cylinder type including a housing 71 of a cylinder shape. In a hollow portion of the housing 71, a movable body 72 composed of a cylindrical piston is inserted, and spring force is applied to the movable body 72, in the right direction in FIG. 4, due to a spring member 73 arranged in the hollow portion. In the housing 72, a fuel inlet 75 is formed concentrically with the movable body 72 such that the fuel F can be introduced into the hollow portion from the assembled fuel passage 63. In a circumferential wall of the housing 71, a pilot port 76 and a main port 77 are formed, while being in communication with the pilot fuel passage 64 and the main fuel passage 65, respectively. In a central portion of the movable body 72, a central passage 80 with a bottom, which is always in communication with the fuel inlet 75, is formed. In a circumferential wall of the movable body 72, a pilot passage 81 and a main passage 82 are formed, respectively extending in the radial direction while being in communication with the central passage and providing openings in the outer circumferential face of the movable body 72.

The pilot port 76 has a first port 76a that will be in communication with the fuel inlet 75 upon both of lower fuel pressure operation as well as upon moderate fuel pressure operation, and a second port 76b that will be in communication with the fuel inlet 75 upon the moderate fuel pressure operation as well as upon higher fuel pressure operation. Between the first port 76a and the second port 76b, the passage area of the first port 76a is set to be greater than that of the second port 76b, such that more fuel can be supplied to the pilot fuel passage 64 via the first port 76a upon communication with the fuel inlet 75. Namely, the first port 76a and the second port 76b are respectively designed to have differently sized orifices. Generally, the fuel flow rate is in proportion to a square root of the fuel pressure when the passage area is constant, while it is in proportion to the passage area when the fuel pressure is constant. Therefore, a desired fuel flow rate corresponding to the load can be obtained by properly changing the passage area based on the fuel pressure.

The provision of the movable body 72 composed of a piston and the housing 71 of a cylindrical shape can achieve a simpler construction in which the piston 72 is moved reciprocally in the housing 71, thus also simplifying the structure of the fuel distributor 66 itself. The spring member 73 is designed to have the spring force such that it can bring both of the pilot port 76 and the main port 77 into a non-communication state with the fuel inlet 75, due to blockage by the piston 72, in a position prior to the activation as shown in FIG. 4, as such the fuel F can not be supplied to both of the pilot fuel passage 64 and the main fuel passage 65.

Next, the operation of the combustor of the gas turbine engine will be described. In the combustor shown in FIG. 3, the fuel F is introduced into the assembled fuel passage 63 from the fuel pump 60 upon the actuation, and the flow rate of the fuel F is controlled by the total flow rate control valve 62. Thereafter, the fuel F is distributed into the pilot fuel passage 64 as well as into the main fuel passage 65, due to the fuel distributor 66, and finally supplied to the fuel spray part 3 and the pre-mixture supply part 4 of each fuel injection unit 2, respectively. The pilot fuel passage 64 and the main fuel passage 65 serve as common passages for all of the fuel injection units 2, respectively. However, upon the lower intensity combustion mode including the engine starting point (or upon the lower fuel pressure operation), the shut-off valve 67 is closed, and the fuel distributor 66 takes a position as shown in FIG. 5.

Figure 5:
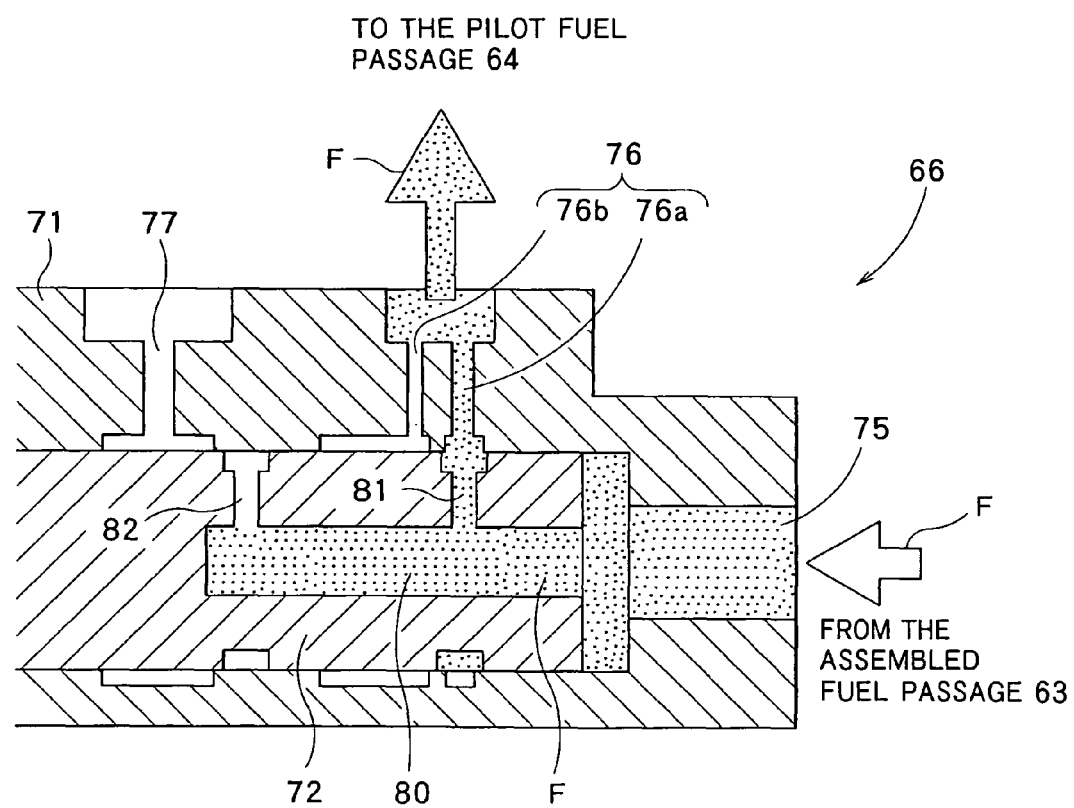
FIG. 5 is a longitudinal section for schematically showing the fuel distributor upon starting the operation as well as upon the lower intensity combustion mode.
Figure 8:
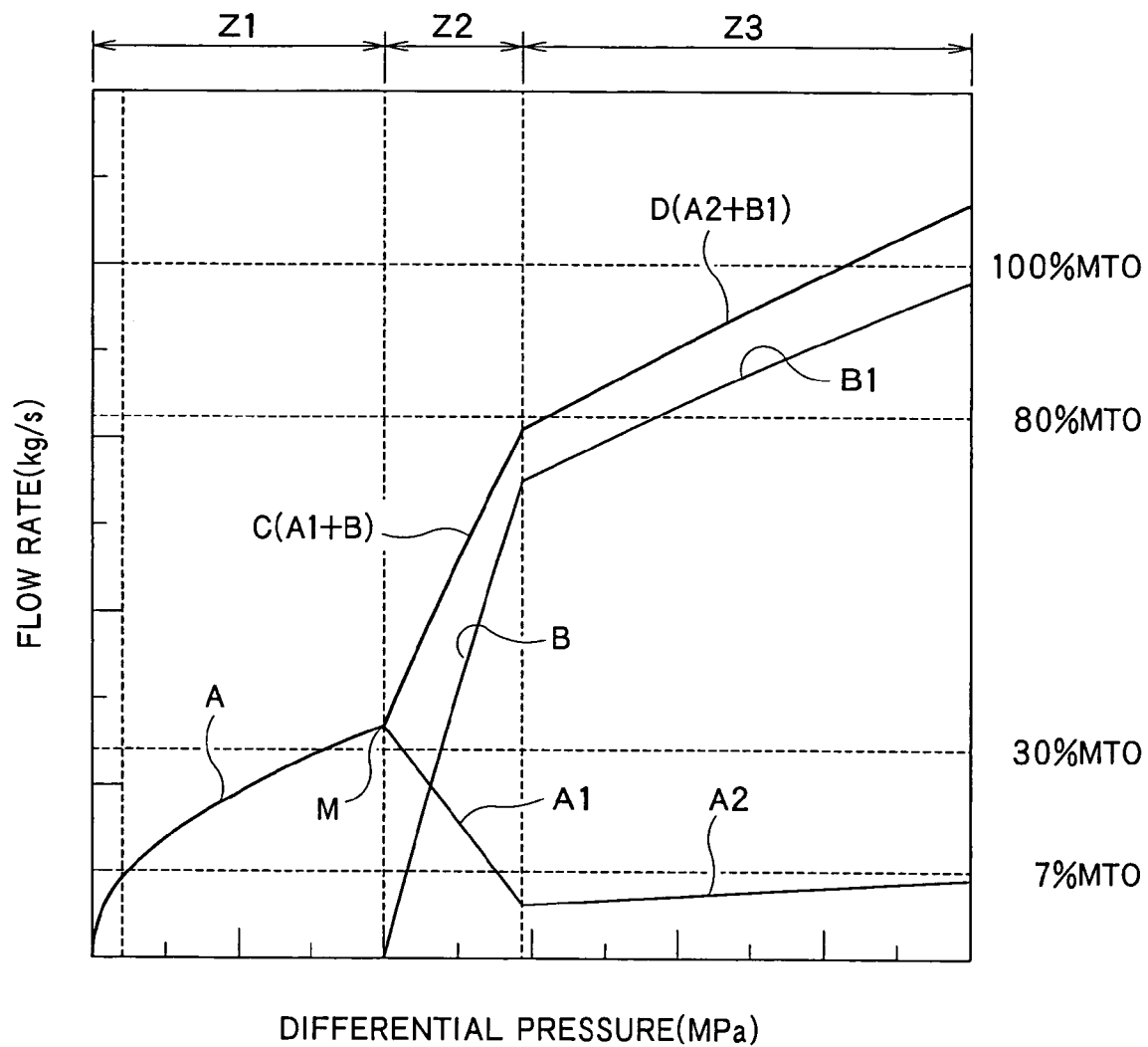
FIG. 8 is a profile showing changes of the flow rate to be associated with changes of pressure of the fuel in the fuel distributor.

In FIG. 5, the pressure of the fuel F to be introduced into the housing 71 from the fuel inlet 75 is a lower fuel pressure corresponding to the lower intensity combustion mode. With such lower fuel pressure, the movable body 72 is moved in the left direction in FIG. 5 against the spring force of the spring member shown in FIG. 4. Then, as shown in FIG. 5, only the first port 76a of the pilot port 76 will be in communication with the fuel inlet 75 via the pilot passage 81 and central passage 80. Consequently, only the diffusion combustion due to the fuel spray part 3 can be performed in each of the fuel injection units 2 as shown in FIG. 3, by using the fuel F to be supplied through the pilot fuel passage 64 from the first port 76a, thereby to ensure stabilized combustion excellent in both of the ignition performance and the flame holding performance. The fuel amount at this point is controlled to depict a curve A in a lower intensity combustion (lower fuel pressure) region Z1 as shown in FIG. 8. The lower intensity combustion region Z1 includes 30% of the prescribed MTO (Max Take OFF). In FIG. 8, the horizontal axis expresses the differential pressure (corresponding to the engine load) between the pressure at the fuel inlet 75 shown in FIG. 4 and the pressure in the combustion chamber 12 shown in FIG. 2, more specifically, the pressure at an outlet EX of the fuel spray part 3, and the vertical axis designates the flow rate of the fuel F.

Figure 6:
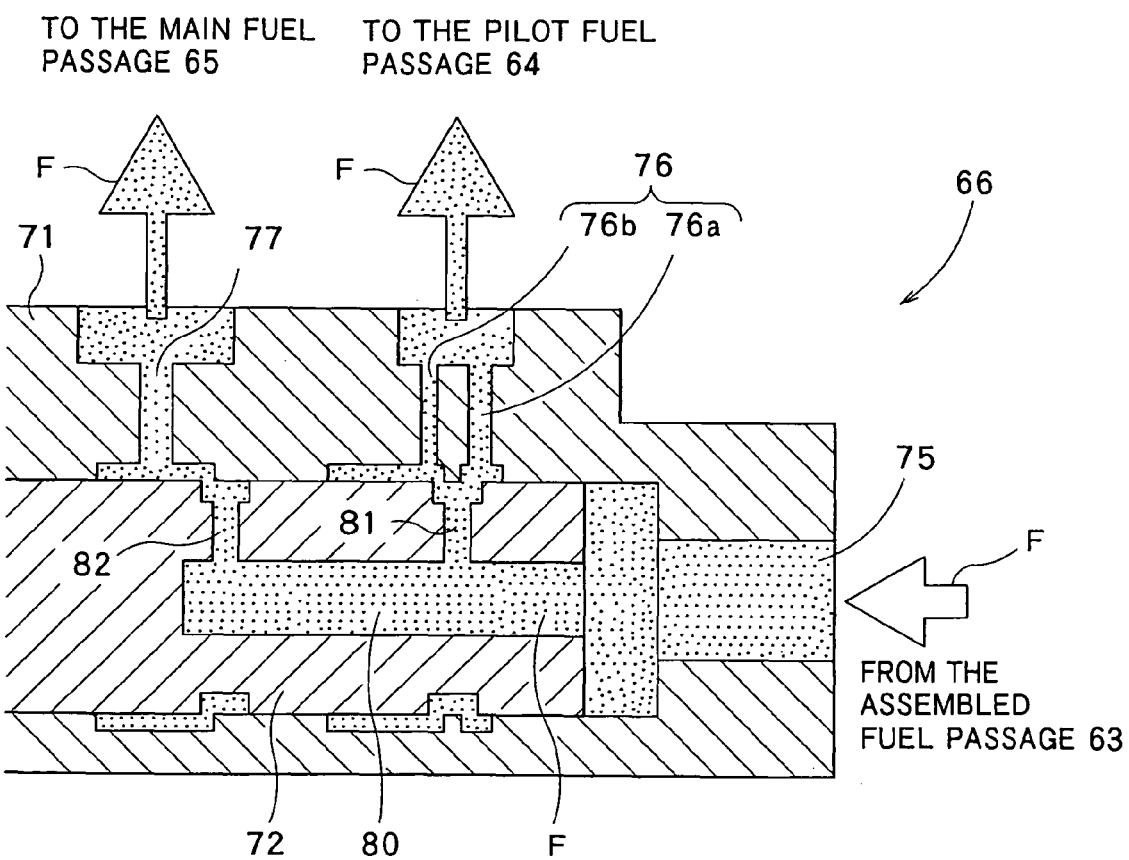
FIG. 6 is a longitudinal section for schematically showing the fuel distributor upon a moderate intensity combustion mode.

Subsequently, when the fuel pressure reaches a moderate fuel pressure corresponding to the moderate intensity combustion mode, as shown in FIG. 6, the movable body 72 is further shifted left so as to bring the first port 76a as well as the second port 76b of the pilot port 76 in communication with the fuel inlet 75 via the pilot passage 81 and central passage 80. In addition, the main port 77 is also in communication with the fuel inlet 75 via the main passage 82 and the central passage 80. Thus, the fuel F is supplied to the respective fuel injection units 2 shown in FIG. 3 from both of the pilot fuel passage 64 and main fuel passage 65, as such the diffusion combustion due to the fuel spray part 3 and the pre-mixture combustion due to the pre-mixture supply part 4 will be performed together. At this time, as the fuel travels left in the movable body 72, the supply amount of the fuel to the thicker first port 76a will be decreased, while that of the fuel to the thinner second port 76b and main port 77 will be increased.

Accordingly, the fuel F to be supplied to the pilot fuel passage 64 will be decreased with increase of the differential pressure, i.e., the increase of the load, as shown by a curve A1 depicted in a moderate intensity combustion region Z2 of FIG. 8, while the flow rate of the fuel to be supplied to the main fuel passage 65 will be increased, as shown by a curve B. Thus, the total flow rate as shown by a curve C in the same intensity combustion region Z2 is a total amount (A1+B) of the curve A1 and curve B, the total amount being set by the total flow rate control valve 62 shown in FIG. 3. In this case, the supply of fuel to the pilot fuel passage 64 is performed, gradually shifting from the first port 76a to the second port 76b, over from the lower intensity combustion region Z1 to the moderate intensity combustion region Z2. Therefore, as in the case of opening the second port 76a after closing the first port 76a, discontinuity of the supply of fuel at a boundary point M between the lower intensity combustion region Z1 and the moderate intensity combustion region Z2 is not seen, thereby to achieve smooth reduction of the fuel flow rate in the pilot fuel passage 64.

Figure 7:
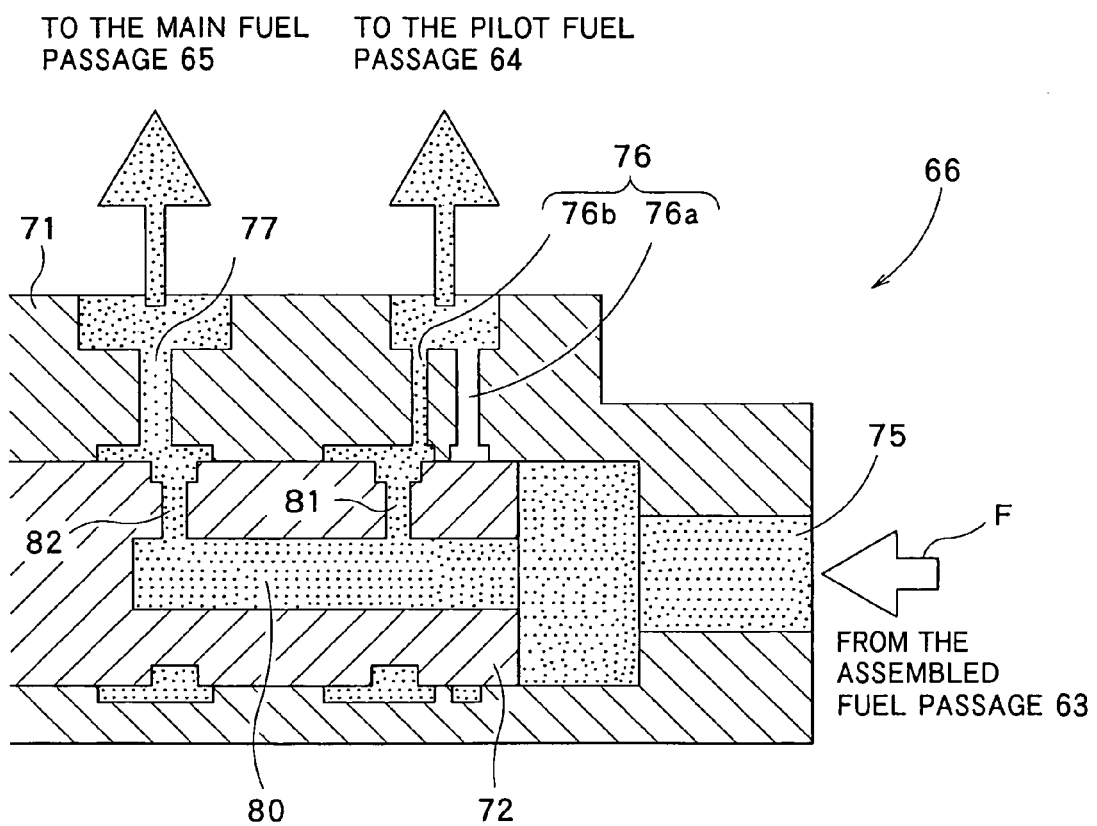
FIG. 7 is a longitudinal section for schematically showing the fuel distributor upon the higher intensity combustion mode.

Thereafter, when the fuel pressure becomes a higher fuel pressure corresponding to the higher intensity combustion mode, as shown in FIG. 7, the movable body is further shifted left such that the main port 77 is in communication with the fuel inlet 75, with a maximum area for the communication, while only the second 76b is in communication with the pilot passage 81, with a passage area less than that of the first port 76a. At this time, the respective passage areas of the second port 76b and main port 77 are set such that the ratio between the flow rate of fuel to be supplied from the second port 76b to the pilot fuel passage 64 and the flow rate of fuel to be supplied from the main port 77 to the main fuel passage 65 will be 1:9. In this way, in the higher intensity combustion region Z3 of FIG. 8, the flow rate through the pilot fuel passage 64 is controlled to be approximately 10% of the total fuel flow rate, as shown by a curve A2, while the flow rate through the main fuel passage 65 reaches approximately 90% of the total fuel flow rate, as shown by a curve B1. Therefore, the total flow rate as shown by a curve D in the same intensity combustion region Z3 is a total amount (A2+B1) of the curve A2 and curve B1. The higher intensity combustion region Z3 includes 85% of the prescribed MTO. In such a higher intensity combustion region Z3, the pre-mixture combustion is performed, as a main operation, to achieve significant reduction of NOx, while the diffusion combustion is performed, as a secondary operation, to secure the stability of combustion.

Figure 3:
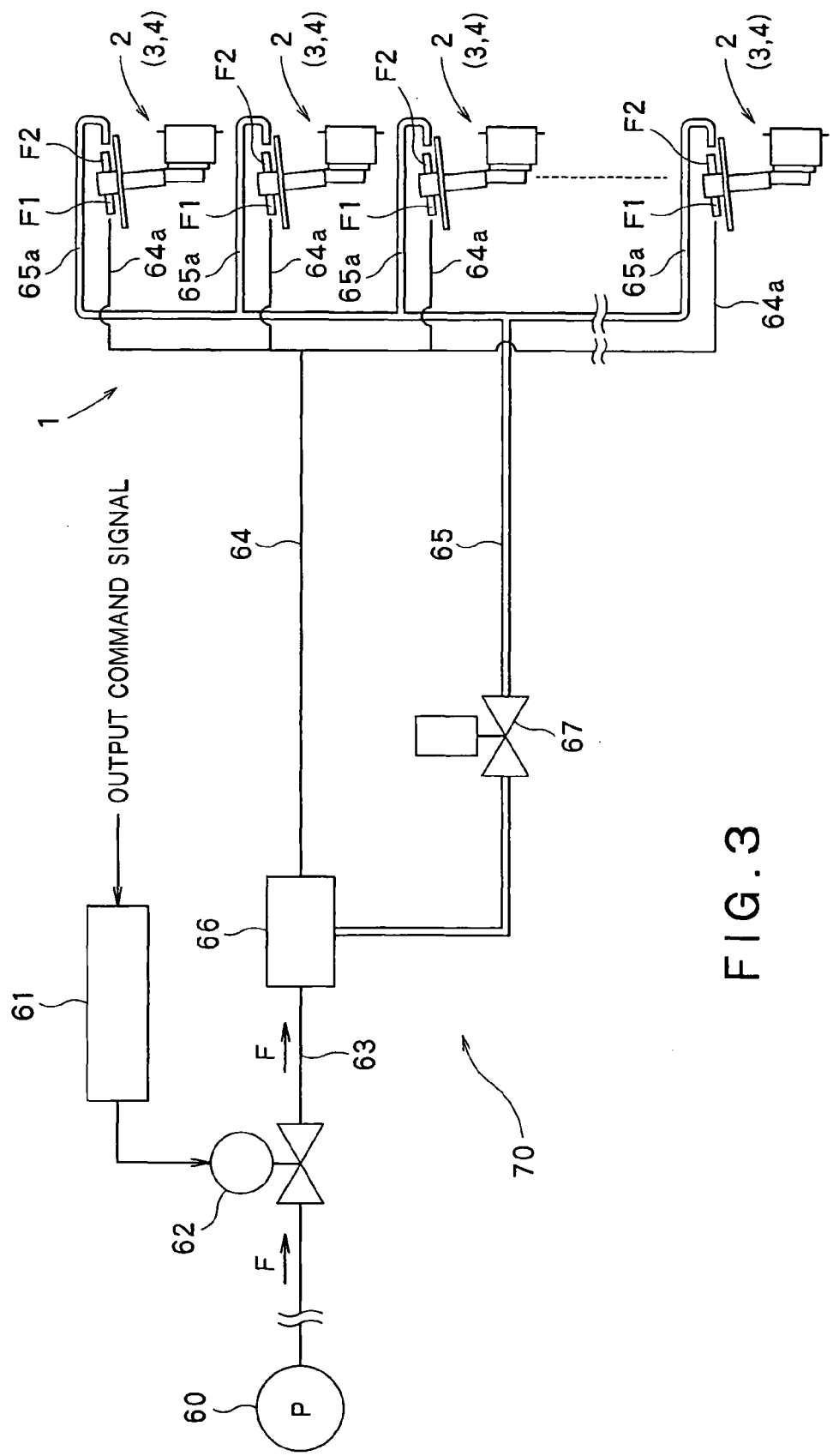
FIG. 3 is a schematic view showing a fuel control system.

In such a manner, due to the fuel distributor 66 provided at the branch point into the pilot fuel passage 64 and the main fuel passage 65 from the assembled fuel passage 63 as shown in FIG. 3, the amounts of fuel to be distributed to the pilot fuel passage 64 and to the main fuel passage 65 can be automatically adjusted corresponding to the fuel pressure, i.e., the engine load, thereby to perform the diffusion combustion and the pre-mixture combustion, at an appropriate ratio, or in proper states respectively, in the combustor 1. Additionally, because of elimination of the need for providing the flow rate control valves to the pilot fuel passage 64 and to the main fuel passage 65 respectively, the structure can be simplified and the cost can be significantly reduced. Furthermore, as described above, the fuel distributor 66 is not designed to be actuated with a complicated control circuit, but adapted to be automatically actuated in accordance with the fuel pressure. Significantly lower cost production can be achieved, and failure of the flow rate control of the fuel to be caused by malfunction of the control circuit can be avoided.

Figure 9:
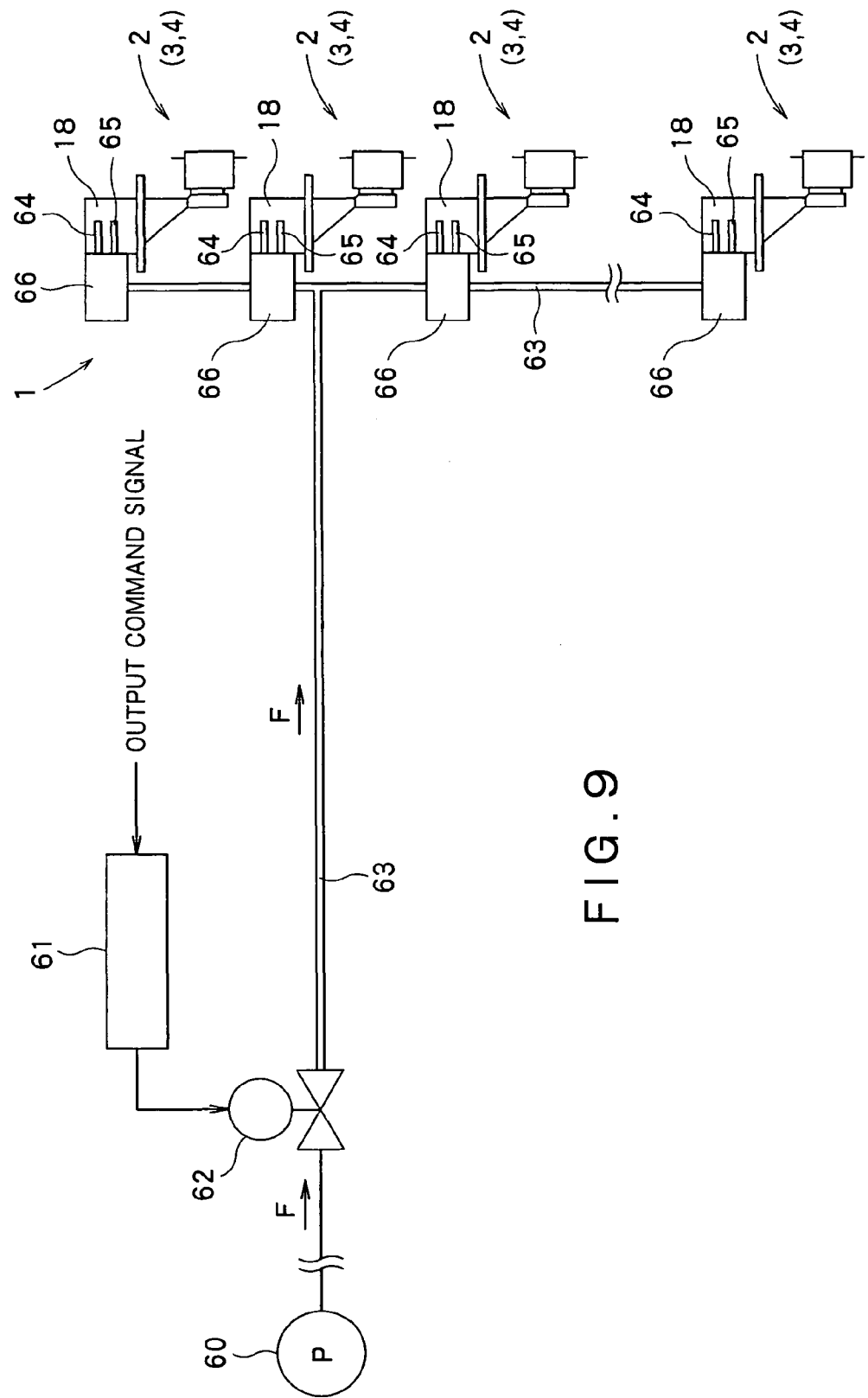
FIG. 9 is a schematic view showing the fuel control system according to a second embodiment of the present invention.
Figure 10:
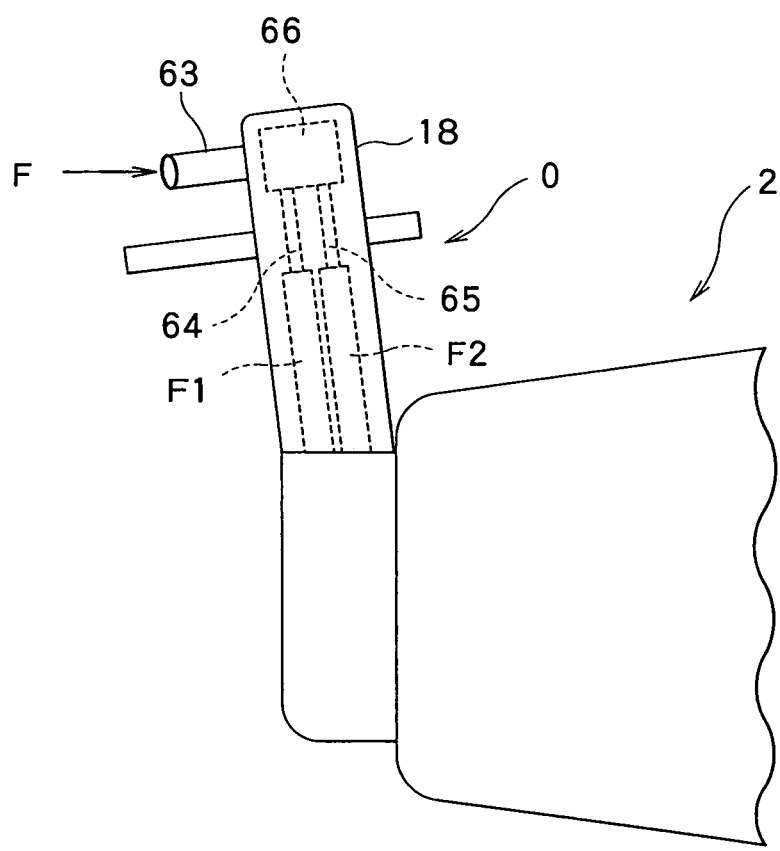
FIG. 10 is an enlarged schematic view showing a key portion of a fuel injection unit in FIG. 9.

FIG. 9 is a schematic view showing the fuel control system according to a second embodiment of the present invention. In this embodiment, the assembled fuel passage 63 is extended up to the respective fuel injection units 2, and the fuel distributor 66 is provided, one for each fuel injection unit 2. Accordingly, the pilot fuel passage 64 and the main fuel passage 65 are provided independently for each fuel injection unit 2. The fuel distributor 66, for example, as shown in FIG. 10, is incorporated in the fuel piping unit 18 of each fuel injection unit 2. Consequently, the piping required for reaching the respective injection units 2 should only be composed of the single thicker fuel passage 63, thus facilitating the piping work for reaching the injection units 2, as compared with the case of using the two passages, i.e., the pilot fuel passage 64 and the main fuel passage 65, as is seen in the first embodiment. The other operation and effect of the second embodiment are the same as in the first embodiment.

While an example that is currently considered to be the most preferable has been discussed somewhat in particular, it should be appreciated that various modifications can be made without departing from the scope and spirit of this invention. Accordingly, it should be understood that the present invention could be implemented in various different aspects from those specifically provided herein.

What is claimed is:

1. A combustor of a gas turbine engine, comprising:
   at least one fuel injection unit including a fuel spray part configured to spray a fuel so that a diffusion combustion region is formed in a combustion chamber, and a pre-mixture supply part configured to supply a pre-mixture of a fuel and an air so that a pre-mixture combustion region is formed in the combustion chamber; and
   a fuel supply unit configured to supply the fuel to the fuel spray part and the pre-mixture supply part,
   wherein the fuel supply unit includes:
   at least one pilot fuel passage and at least one main fuel passage configured to supply the fuel to the fuel spray part and the pre-mixture supply part, respectively;
   an assembled fuel passage configured to supply the fuel to the pilot fuel passage and the main fuel passage; and
   at least one fuel distributor disposed at a branch point where the assembled fuel passage is connected to both of the at least one pilot fuel passage and the at least one main fuel passage, the at least one fuel distributor being configured to automatically control amounts of the fuel to be distributed to the at least one pilot fuel passage and to the at least one main fuel passage in accordance with a pressure of the fuel,
   wherein the at least one fuel distributor includes a fuel inlet into which the fuel is introduced from the assembled fuel passage, and a pilot port and a main port which are respectively connected to the at least one pilot fuel passage and the at least one main fuel passage, the pilot port including a first port and a second port, wherein a passage area of the first port is greater than a passage area of the second port,
   wherein the at least one fuel distributor includes a movable body configured to be moved in accordance with a pressure of the fuel at the fuel inlet so as to bring only the pilot port in communication with the fuel inlet upon a lower fuel pressure operation and bring both of the pilot port and the main port in communication with the fuel inlet upon a moderate fuel pressure operation as well as upon a higher fuel pressure operation, and wherein the first port is configured to be in communication with the fuel inlet upon the lower fuel pressure operation as well as upon the moderate fuel pressure operation and the second port is configured to be in communication with the fuel inlet upon the moderate fuel pressure operation as well as upon the higher fuel pressure operation, wherein the first port is closed in the high fuel pressure operation.

2. The combustor of the gas turbine engine according to claim 1, wherein the at least one fuel injection unit comprises a plurality of fuel injection units, and wherein the at least one pilot fuel passage and the at least one main fuel passage are configured to supply the fuel to the plurality of fuel injection units.

3. The combustor of the gas turbine engine according to claim 1, wherein the at least one fuel injection unit comprises a plurality of fuel injection units, wherein the at least one fuel distributor comprises a plurality of fuel distributors, each of the fuel distributors being disposed for each of the plurality of fuel injection units, and wherein the at least one pilot fuel passage comprises a plurality of pilot fuel passages, and the at least one main fuel passage comprises a plurality of main fuel passages, the pilot fuel passages and the main fuel passages being independently provided for respective fuel injection units.

4. The combustor of the gas turbine engine according to claim 1, wherein the pilot port, the main port and the fuel inlet are formed on a housing, the movable body being a piston housed in the housing.

5. The combustor of the gas turbine engine according to claim 1, further comprising a flow rate control valve disposed to the assembled fuel passage, the flow rate control valve being configured to control a total flow rate of the fuel throughout the combustor.

* * * * *